April 13, 1937. B. J. ANDERSON 2,077,197
VELOCIPEDE FRAME
Filed Sept. 26, 1935 2 Sheets-Sheet 1
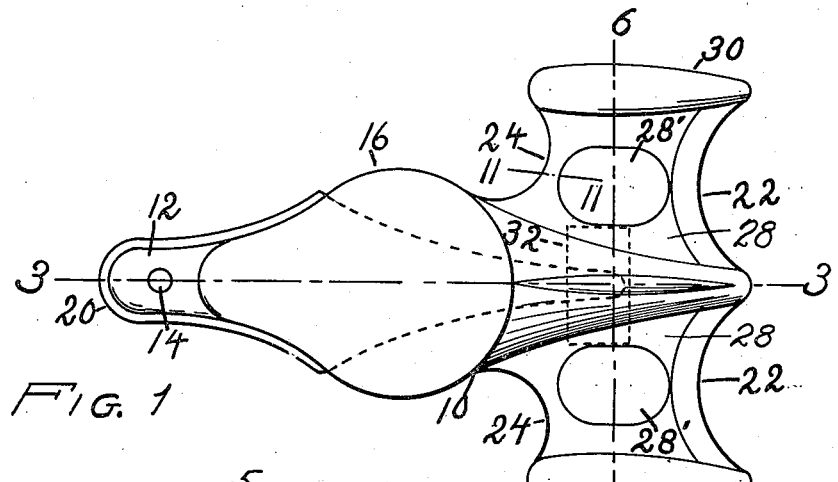
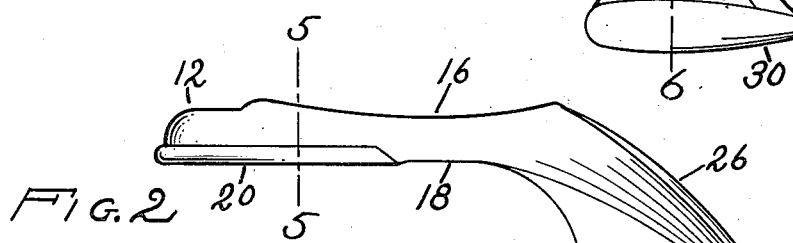
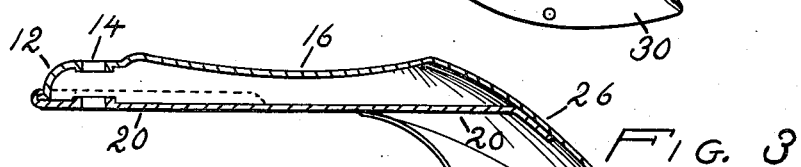
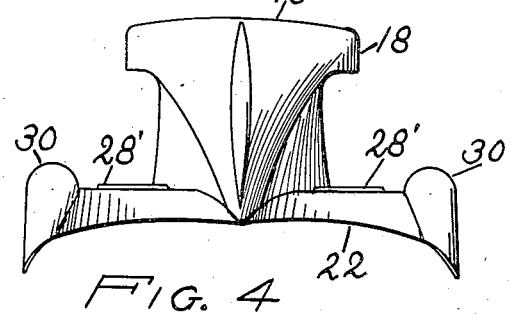
BERT J. ANDERSON
INVENTOR
By Leon T. Hooker
ATTORNEY April 13, 1937. B. J. ANDERSON 2,077,197
VELOCIPEDE FRAME
Filed Sept. 26, 1935 2 Sheets-Sheet 2
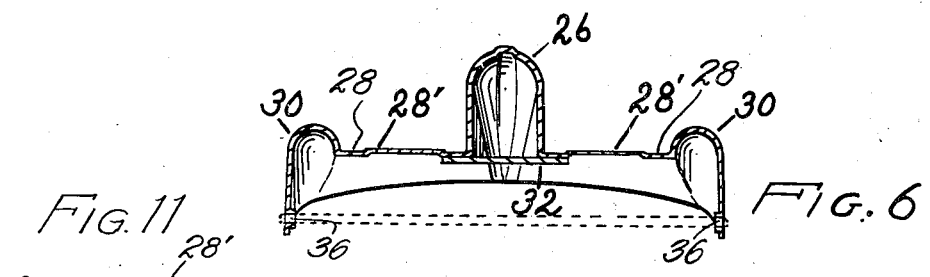
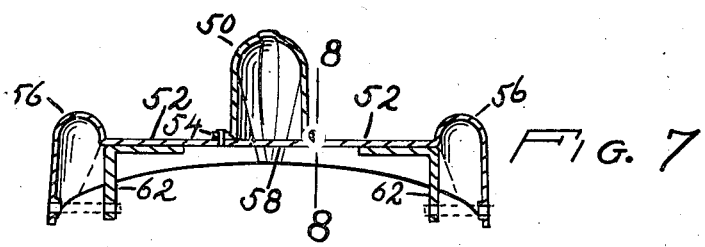
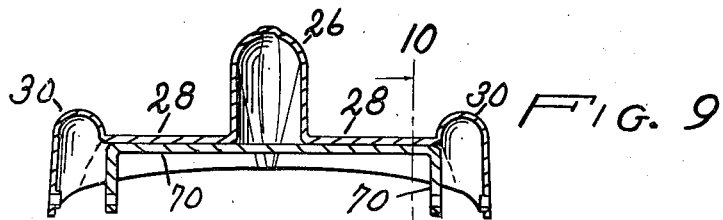
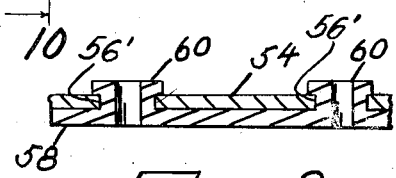
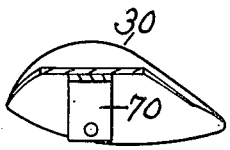
BERT J. ANDERSON
INVENTOR
By Leon T. Hooper
ATTORNEY Patented Apr. 13, 1937

2,077,197

UNITED STATES PATENT OFFICE 2,077,197

VELOCIPEDE FRAME

Bert J. Anderson, Hammond, Ind.

Application September 26, 1935, Serial No. 42,303

9 Claims. (Cl. 208—113)

This invention relates to an improved velocipede frame and consists of a structure wherein the backbone, seat, axle supporting member and fenders may be constructed of a single stamping or may be formed of several stampings which, before distribution to the public, are permanently secured together, preferably by spot welding or riveting, to form an integral frame.

One of the chief objects of advantage of the frame of this invention resides in the provision of means for fabricating a light yet exceedingly strong frame in a limited number of operations and at a low cost.

Another object of advantage and importance resides in the fact that where the frame is constructed of several stampings they may be shipped to assembly point in knocked down condition and be there assembled into rigid integral frames.

A still further object of importance and advantage resides in the provision of means for riveting together various parts of modified embodiments of the invention.

Still another and further important object of the invention resides in the provision of means for supporting an axle outwardly of the wheels.

An additional object of advantage and importance resides in the provision of means for supporting an axle on each side of each rear wheel.

Additional objects of importance and advantage, some of which are hereinafter more specifically set forth, will be apparent from the disclosures made in the following specification and the annexed drawings.

Preferred embodiments of the invention are shown in the drawings and hereinafter more fully described.

In the drawings:

Figure 1 is a top plan view of the preferred embodiment of the frame of this invention.

Figure 2 is a side elevational view thereof.

Figure 3 is a section taken on the line 3—3 of Figure 1.

Figure 4 is a rear elevational view of the frame.

Figure 5 is a section taken on the line 5—5 of Figure 3.

Figure 6 is a section taken on the line 6—6 of Figure 1.

Figure 7 is a section of a frame showing a slightly modified embodiment of the invention.

Figure 8 is a slightly enlarged section taken on the line 8—8 of Figure 7.

Figure 9 is a section of a frame showing a still further modified form of the invention.

Figure 10 is a section taken on the line 10—10 of Figure 9.

As shown in the drawings:

The reference numeral 10 indicates in a general way a stamping which is substantially T-shaped in plan formation, as is best shown in Figure 1, and forms the velocipede frame of this invention.

The forward end 12 of the stamping 10 is relatively narrow as compared with the balance of the frame and is apertured 14 to receive a steering post.

The intermediate portion of the frame is expanded gradually to form a comfortable saddle shaped seat 16. The edges 18 of the seat 16 and the forward end 12 are turned downwardly and spaced apart.

Positioned parallel to the edges and spanning the distance between the spaced apart sides is an apertured spacing member 20. The aperture in the member 30 is positioned in alignment with the aperture 14 to form a steering post bearing.

The transverse portion of the preferred embodiment of the T-shaped frame has a downwardly inclined rear edge 22. Portions of the forward edges 24 of the transverse portion of the frame are curved downwardly as is best shown in Fig. 11 to stiffen the frame and to prevent torsional strain.

The central rear part 26 of the frame extending from the rear of the seat 16 to the extreme end thereof is longitudinally convex and transversely U-shaped, to carry out the streamlining effect and also to provide rigid support for the parts projecting therefrom.

Projecting outwardly from each side of the central rear part 26 is a transverse member 28. The member 28 is preferably formed with raised portions on the upper surface thereof which provides step plates $28^1$ to facilitate mounting and dismounting from the vehicle.

Portions adjacent both outer ends of the transverse member 28 of the T-shaped frame are bulged upwardly and then turned downwardly at right angles to the horizontal portions thereof to form fenders 30.

It will be noted that the tops of the fenders plates $28^1$, thus affording protection against a child's foot slipping therefrom.

Secured to the under surface of the step plate supporting member, preferably by spot welding, and spanning the raised central rear part 26, is a tie member 32 adapted to brace and maintain the transverse portion of the frame in proper alignment.

Each fender 30 has an aperture 36 adjacent the lower edge thereof to receive and support an axle.

A slightly modified form of the invention is shown in Figures 7 and 8 wherein the longitudinal portion 50 and the transverse portion 52 of the T-shaped frame are formed in separate pieces. In this modified embodiment of the invention the edges 54 of the lower rear part of the longitudinal portion of the frame is turned outwardly to provide means whereby the part may be secured to the transverse portion 52.

A plurality of spaced apertures 56¹ closely adjacent the outwardly turned edges 54 provide a means for securing longitudinal and transverse parts together.

The transverse portion 52 of the T-shaped frame has an integral fender 56 on each end thereof and a flat central portion 58 therebetween. Formed in the central portion 58 of the transverse portion is a plurality of spaced apart drawneck apertures 60 which are adapted to register with the apertures 56¹ when the parts are brought together. The drawneck apertures 60 are in effect tubular rivets which are adapted to permanently secure the parts together. It will be apparent that additional means, as spot welding, may be used for securing the parts together.

The modification here described also provides axle supporting means in the form of apertured brackets 62 which are positioned beneath the transverse portion of the frame as is clearly shown in Figure 7.

A still further modified embodiment of the invention is shown in Figures 9 and 10 wherein an axle supporting member 70 having downwardly turned apertured ends is positioned beneath the frame. It will be apparent that this modified axle supporting member 70 may be used in conjunction with either the preferred embodiment of the invention or with the two piece modification thereof.

It will be further apparent that herein is provided a light, practical and sturdy sheet metal frame which may be economically maufactured.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

1. A velocipede frame substantially T-shaped in plan formation, the forward end of the longitudinal portion of said frame being apertured to receive a steering post, each end of the transverse portion of the frame comprising an integral apertured fender, a saddle shaped seat formed of the frame itself intermediate the ends, and axle supporting means positioned beneath the transverse portion of said frame intermediate the ends thereof.

2. A velocipede frame substantially T-shaped in plan formation, the forward end of the longitudinal portion of said frame being apertured to receive a steering post, the sides of said longitudinal portion being turned downwardly and spaced apart, an apertured spacing member secured to the exterior surface of the forward portion of the frame and to the interior surface of the rear portion thereof, each end of the transverse portion of the frame comprising an integral apertured fender, a saddle shaped seat formed of the frame itself intermediate the ends, and means for positioning an axle beneath the transverse portion of said frame.

3. A velocipede frame substantially T-shaped in plan formation, the forward end of the longitudinal portion of said frame being apertured to receive a steering post, the sides of said longitudinal portion being turned downwardly and spaced apart, means for maintaining said sides in spaced apart relation, said means comprising an apertured spacing member extending substantially the entire length of the frame the forward portion thereof being secured to the exterior surface of said frame and the rear portion being secured to the interior surface thereof and a substantially flat member positioned transverse the backbone portion of the frame, each end of the transverse portion of the frame comprising an integral apertured fender, a saddle shaped seat formed of the frame itself intermediate the ends, and means for positioning an axle beneath the transverse portion of said frame.

4. A velocipede frame substantially T-shaped in plan formation, the forward end of the longitudinal portion of said frame being apertured to receive a steering post, the sides of said longitudinal portion being turned downwardly and spaced apart, means for maintaining said sides in spaced apart relation, said means including an apertured stamping the forward portion of which is secured to the exterior surface of the frame the rear portion of said spacing member being secured to the interior surface of the rear part of the frame, each end of the transverse portion of the frame comprising an integral apertured fender, a saddle shaped seat formed of the frame itself intermediate the ends, and means for positioning an axle beneath the transverse portion of said frame.

5. A velocipede frame substantially T-shaped in plan formation, the forward end of the longitudinal portion of said frame being apertured to receive a steering post, the sides of said longitudinal portion being turned downwardly and spaced apart, means for maintaining said sides in spaced apart relation, said means including an apertured stamping the forward portion of said stamping being of substantially channel formation, the flanges of said forward portion being secured to the exterior surface of the front part of the frame, the rear portion of said stamping being flat and secured to the interior surface of the frame near the rear end thereof, each end of the transverse portion of the frame comprising an integral apertured fender, a saddle shaped seat formed of the frame itself intermediate the ends, and means for positioning an axle beneath the transverse portion of said frame.

6. In a velocipede frame, a rear frame member having an integral fender on each end thereof, and means near the central portion of said member for securing a backbone thereto, said means comprising a plurality of upwardly extending cylindrical members.

7. In a velocipede frame, a rear frame member having an integral fender on each end thereof, and means near the central portion of said member for securing a backbone thereto, said means comprising a plurality of upwardly extending tubular members, said tubular members being formed of portions of the rear frame member itself.

8. In a velocipede frame, a rear frame member having an integral fender on each end thereof, means near the central portion of said member for securing a backbone thereto, said means comprising a plurality of spaced tubular projections formed of the transverse member and adapted to be inserted in a like plurality of spaced apertures in a backbone and be crimped upon the edges of said apertures, and means for supporting an axle beneath said member.

9. In a velocipede frame means for securing the front portion thereof to the rear portion, said means comprising a plurality of spaced receiving apertures in one portion of the frame in registering position with a like number of cylindrical projections on the other portion, said projections being adapted to be expanded when said front and rear portions of the frame are joined.

BERT J. ANDERSON.